United States Patent

Miwa

[11] Patent Number: 5,105,866
[45] Date of Patent: Apr. 21, 1992

[54] RADIAL TIRE FOR MOTOR CYCLES HAVING FOLDED BELT LAYERS

[75] Inventor: Nobuo Miwa, Kobe, Japan

[73] Assignee: Sumitomo Rubber Industries, Ltd., Hyogo, Japan

[21] Appl. No.: 412,523

[22] Filed: Sep. 26, 1989

[30] Foreign Application Priority Data

Sep. 26, 1988 [JP] Japan .................. 63-243087

[51] Int. Cl.⁵ .................. B60C 9/26; B60C 9/18
[52] U.S. Cl. .................. 152/538; 152/528; 152/535
[58] Field of Search .......... 152/526, 528, 529, 535, 152/538, 454

[56] References Cited

U.S. PATENT DOCUMENTS 4,790,364 12/1988 Lobb et al. .................. 152/454
4,807,681 2/1989 Kadota .................. 152/535
4,854,362 8/1989 Carolla et al. .

FOREIGN PATENT DOCUMENTS 59-67108 4/1984 Japan .

Primary Examiner—Michael W. Ball
Assistant Examiner—Gregory J. Wilber
Attorney, Agent, or Firm—Birch, Stewart, Kolasch & Birch

[57] ABSTRACT

A radial tire for motor cycles having a belt layer composed of a first belt ply B1, a second belt ply B2 and a third belt ply B3 with includes a respective base part of A1, A2 and A3 superimposed one upon another on a carcass. The first belt ply B1 has lateral skirts F folded radially outwardly at both lateral edges of the base part A1. The skirts F cover the lateral cut end of the second belt ply B2 and are overlapped with the third belt ply B3 so as to improve the adhesion to the tire rubber and the rigidity of the tread shoulder. Furthermore, the ratio BW/TW of the belt width BW to the tread width TW is set to be 0.75 or more, the ratio FW/TW of the skirt width FW to the tread width TW is set to be 0.01 to 0.35, and the ratio OW/FW of the overlapped width OW to the skirt width FW is set to be 0.7 or more.

1 Claim, 2 Drawing Sheets

RADIAL TIRE FOR MOTOR CYCLES HAVING FOLDED BELT LAYERS

BACKGROUND OF THE INVENTION

The present invention relates to a radial tire for motor cycles which can alleviate the ply separation at both edges of belt layer without reducing the rigidity of shoulder region of a tire tread.

In recent years, in company with arrangement of the highway networks and high speed use of vehicles, radial tires have been introduced to the motor cycle. On the other hand, such a tire for motor cycles has a tread region in which the radius is rather small in comparison with that of a tire for a passenger car, and therefore, the shearing strain produced by the tread deformation under load becomes larger, and rubber separation at both belt edges is apt to occur.

Accordingly, to prevent the rubber separation, heretofore, as shown in FIG. 2, the belt layer A is composed of a plurality of belt plies, generally three cut end belt plies B1, B2 and B3, wherein the belt widths are different relative to each other. The belt plies are superimposed one upon another with the wider width being on the carcass side so as to alleviate the rigidity difference at both edges of said belt layer A.

However, such belt layer A constructed as above become unsatisfactory in the rigidity at the tread shoulder S, so that the steering stability, such as running stability during cornering, is remarkably deteriorated.

SUMMARY OF THE INVENTION

It is an object of the present invention to provide a radial tire for a motor cycle which can reduce the ply separation without reducing the rigidity of shoulder part, thereby increasing the steering stability and durability.

According to one aspect of the present invention, a radial tire for motor cycles has a belt layer comprising a first belt ply B1, a second belt ply B2 and a third belt ply B3 which include a respective base part A1, A2 and A3 superimposed one upon another from the carcass side to the radially outward side and each composed of belt cords arranged parallel to each other;

said first belt ply B1 having a lateral skirts F folded radially outwardly at each lateral edge of said base part A1;

each lateral edge of said base part A2 of said second belt ply B2 being positioned between said base part A1 and said lateral skirts F of said first belt ply B1; and each lateral edge of said base part A3 of said third belt ply B3 being positioned on the radially outward side of said skirt F so as to form overlapped parts overlapped with said skirt F; wherein;

the ratio BW/TW of the belt width BW which is the axial length of the widest base part among said base parts A1, A2 and A3 along the base part to the tread width TW which is the axial length of said tread T along the tread surface is 0.75 or more, e.g. 0.75–0.85 the ratio FW/TW of the skirt width FW which is the axial length of said lateral skirt F along skirt F to said tread width TW is 0.1 or more and 0.35 or less;

the ratio OW/FW of the overlapped width OW which is the axial length of said overlapped part along the overlapped part to said skirt FW is 0.7 or more, e.g. 0.7–0.9 and said belt cards are laid at an angle of 25 degrees or less with respect to the equator of the tire and crossed with each other between adjacent belt plies.

As above described, the belt layer according to the present invention is composed of covering both edges of the second belt ply with the skirts of the first belt ply, thereby the rubber looseness caused at ply edges and the movement of said ply edges can be effectively restrained so as to prevent rubber separation.

The ratio BW/TW is set to be 0.75 or more, and the ratio FW/TW is set to be 0.1 or more and 0.35 or less, thereby the rigidity of tread shoulder can be increased, in addition, the ratio OW/FW is set to be 0.7 or more in order to maintain camber thrust, by which steering stability such as cornering property is incresed.

The cords in each ply are laid at an angle of 25 degrees or less and cross with each other to evenly increase the tread rigidity, thereby the straight running stability during high speed run and the wear resistance are improved.

BRIEF DESCRIPTION OF THE DRAWINGS

An embodiment according to the present invention will now be described referring to the drawings, in which.

DETAILED DESCRIPTION OF THE INVENTION

Figure 1:
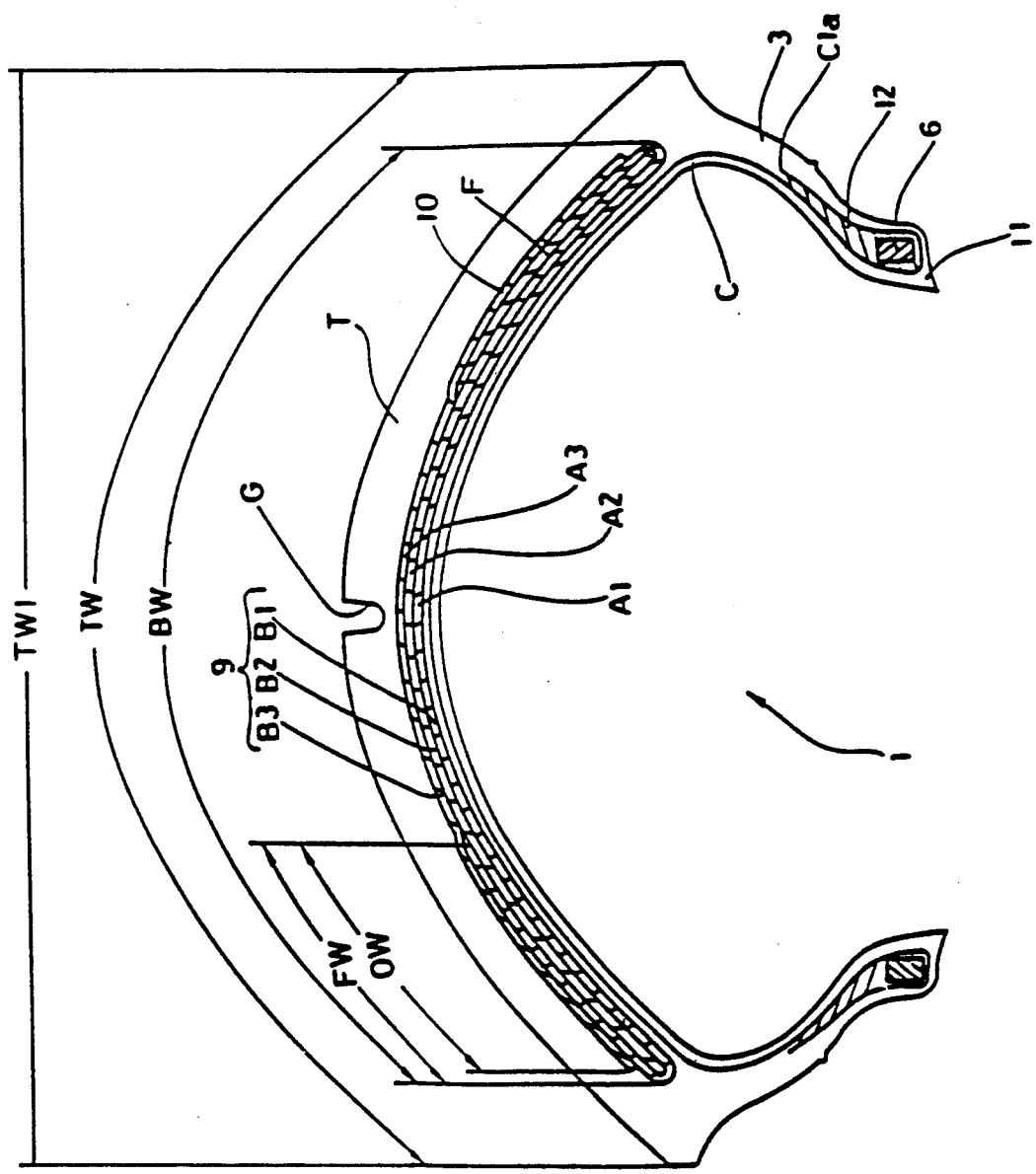
FIG. 1 is a sectional view showing an embodiment of the present invention.

In the drawing, a tire 1 has a tread T, sidewalls 3 extending radially inwardly from both ends of the tread T, and bead regions 11 positioned at the radially inward ends of the sidewalls 3. A tire 1 is provided with a toroidal carcass C wrapped at each edge around bead cores 6 in the bead regions 11 and a belt layer 9 arranged radially outside said carcass C.

Herein, the tread T on the radially outward side of the carcass C extends nearly parallel to the carcass contour from the crown center to both tread edges. The tread has a straight width which is larger than the maximum sidewall width.

The carcass C of the present embodiment is composed of one carcass ply having carcass cords laid at an angle ranging from about 70 degrees to 90 degrees with respect to the circumferential direction of the tire. Both edges C1a of the carcass C are folded or wrapped from inside to outside around the bead core 6 and terminated in the sidewall 3, whereby the lateral rigidity is increased. If said carcass cord angle is less than 70 degrees, improvement of high speed running properties characterized by a radial tire is scarcely achieved.

The carcass C may be composed of a plurality of carcass plies.

As the carcass cords, such organic fiber cords whose initial modulus is less than 1500 kgf/mm$^2$, such as rayon, polyester and the like are employed. Especially, for example, nylon fiber cords of less than 500 kgf/mm$^2$ are preferably used.

The belt layer 9 has a three layer construction composed of a first belt ply B1, a second belt ply B2 and a third belt ply B3. The belt plies B1, B2 and B3 include a respective base part of A1, A2 and A3, each extending the circumferential direction of the tire parallel to the crown contour of the carcass C, and are superimposed one upon another from the carcass side toward the radially outward side.

The first belt ply B1 is a folded end ply having lateral skirts F folded radially outwardly at each lateral edge of the base part A1. In this embodiment, said base part A1 has an axial width larger than that of other base parts A2 and A3.

Therefore, in this case, said axial width of the base part A1 gives a belt width BW defined as the axial length of the widest base part among said base parts A1, A2 and A3.

The first belt ply B1 is formed in such a way that the ratio BW/TW of said belt width BW to the tread width TW in the axial width along the tread outer surface is 0.75 or more so as to increase the hoop effect of tread T over about its whole width. The ratio FW/TW of the folded width FW which is the length of the skirt F in the axial direction along said skirts F to said tread width TW is set to be 0.1 or more and 0.35 or less. If said ratio FW/TW is less than 0.1, the rigidity of tread shoulder part become unsatisfactory so as to lower the running performance during cornering. On the other hand, if it is over 0.35, the rigidily of tread crown part is unnecessarily increased and also the material cost is increased, and there is a problem that the efficiency in tire manufacturing work decreases.

The second belt ply B2 is a cut end ply composed of only the base part A2 having a axial width greater than the distance between the two free edges of said skirts F. Both side edges of said base part A2 are positioned between said skirt F and said base part A1 so as to cover its cut ends, whereby adhesion to rubber is improved.

The third belt ply B3 is the same cut end ply composed of only the base part A3 as said second belt ply B2 and superimposed on the radially outward side of said skirts F to from the overlapped parts 10 overlapped with said skirt F at both lateral edges of base part A3. The ratio OW/FW of the overlapped width OW in the axial diredtion along the overlapped part 10 to said folded width FW is set to be 0.7 or more, thereby the camber thrust is maintained when the tire is tilted.

Each belt ply B1, B2, B3 contains belt cords which lie at an angle of 25 degrees or less with respect to the equator of the tyre and cross each other between abjacent plies, by which the tread rigidity is evenly increased so as to improve high speed straight running stability and wear resistance.

As the belt cords, nylon fiber cords and the like, whose initial modulus of elasticity is about 200 to 400 kgf/mm$^2$, are preferably employed, such kind of belt cords improve the shock absorption and comfort during running.

Further, in accordance with service conditions, organic fiber cords with high modulus, for example aromatic polyamide fiber cords, whose initial modulus of elasticity is about 3500 kgf/mm$^2$ or more than that, may be employed.

Furthermore, in the present embodiment, each bead region 11 is provided with a bead apex 12 composed of hard rubber material which is mounted on the bead core 6 and extends radially outward between the carcass C and its turned up portion C1a, whereby the lateral rigidity of the tire is increased.

EXAMPLE

A specific series of examples will now be compared.

Motor cycle tires were made of the size 150/60 R18 with the structure as shown in Table 1 and 2. The test tires were mounted on the rear wheel of a motor cycle for field test to compare steering stability and wear resistance.

Steering stability was collectively evaluated with running stability, handling effect during full bank, high speed straight running and high speed cornering, and grip performance during straight running and cornering by feel using a skilled test rider. Evaluated values of each performance are shown as relative to the value of the prior art tire being set as 100, the higher the value, the better the tire. Wear resistance is evaluated by remaining depth of center groove G after 4000 km running on the straight road, in which evaluated values are shown as relative to the value of the prior art tire being set as 100, the higher the value, the better the tire.

TABLE 1

|  | carcass ply | first belt ply | second belt ply | third belt ply |
|---|---|---|---|---|
| ply cord | 2/1260 d/53ends* | 2/1260 d/53ends | 2/1260 d/53ends | 2/1260 d/53ends |
| cord material | nylon | nylon | nylon | nylon |
| cord angle | 90° | 16° | 16° | 16° |
| 100% modulus of Topping Rubber | 20 kgf/cm$^2$ | 20 kgf/cm$^2$ | 20 kgf/cm$^2$ | 20 kgf/cm$^2$ |

*ends/5 cm

TABLE 2

Figure 2:
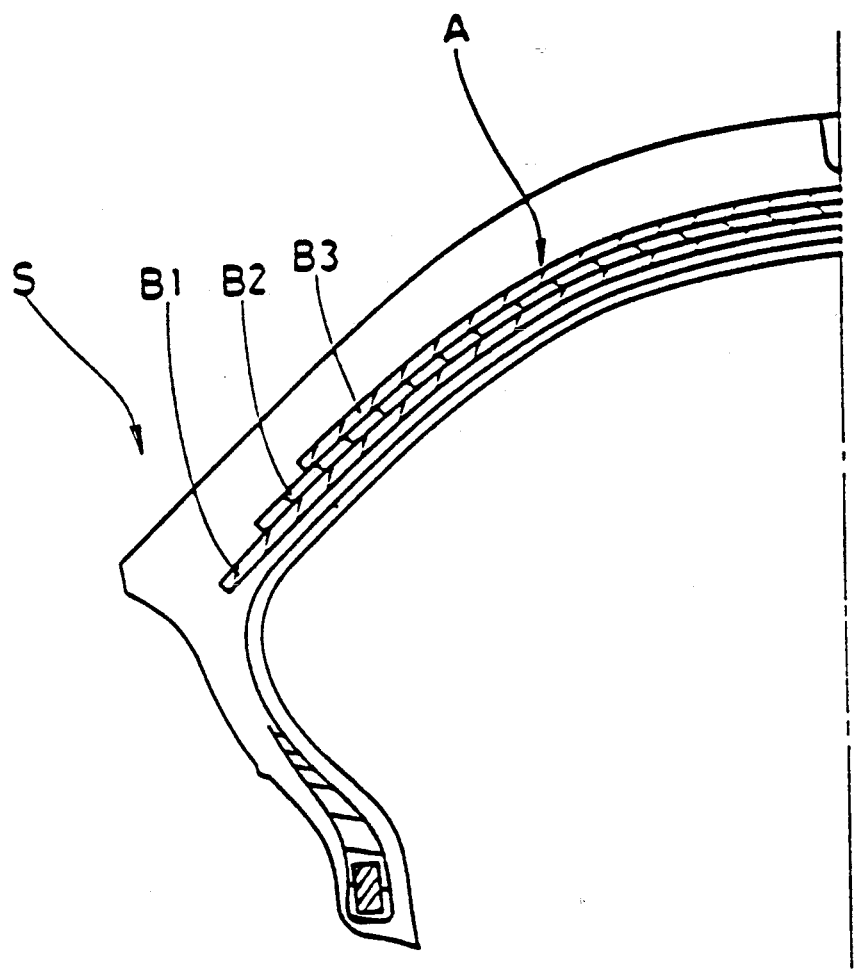
FIG. 2 is a partial sectional view showing a prior art tire.

|  | embodiment No.1 | embodiment No.2 | comparative example NO.1 | comparative example NO.2 | comparative example NO.3 | prior art tire |
|---|---|---|---|---|---|---|
| belt construction | FIG.1 | FIG.1 | FIG.1 | FIG.1 | FIG.1 | FIG.2 |
| ratio BW/TW | 0.85 (165/195) | 0.85 (165/195) | 0.85 (165/195) | 0.85 (165/195) | 0.85 (165/195) | 0.85 (165/195) |
| ratio FW/TW | 0.3 (58/195) | 0.1 (20/195) | 0.4 (78/195) | 0.08 (16/195) | 0.3 (58/195) | — (0/195) |
| ratio OW/FW | 0.90 (52/58) | 0.70 (14/20) | 0.65 (50/78) | 0.65 (6.5/10) | 0.90 (52/58) | — — |
| cord angle |  |  |  |  |  |  |
| first belt ply | 16° | 16° | 16° | 16° | 30° | 16° |
| second belt ply | 16° | 16° | 16° | 16° | 30° | 16° |
| third belt ply | 16° | 16° | 16° | 16° | 30° | 30° |
| steering stability | 120 | 115 | 100 | 105 | 105 | 100 |
| wear resistance | 105 | 105 | — | — | 90 | 100 |
| belt separation | NO | NO | — | *1 | — | *2 |

*1 separate at 3 mm width
*2 separate to 5 mm width

As apparent from Table 2, embodiments No. 1 and No. 2 are not caused belt separation and are improved in steering stability and wear resistance in compared with comparative examples from No. 1 to No. 3 and the prior art tyre 1.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A radial tire for motor cycles having a carcass extending from a tread (T) through a sidewall and folded around a bead core of a bead part, and a belt layer of three plies which are a first belt ply (B1), a second belt ply (B2) and a third belt ply (B3) superimposed one upon another from the carcass side toward the outer surface of the tread T;

said tread (T) having a straight width (TW1) in the tire axial direction which is larger than the maximum width of the tire in the tire axial direction at the sidewall;

each of said first, second and third belt plies (B1), (B2) and (B3) including belt cords arranged parallel to each other;

said first belt ply (B1) formed by a base part (A1) provided on said carcass and a lateral skirt (F) folded radially outwardly at each lateral edges of said base part (A1);

said second belt ply (B2) formed by a base part (A2) provided on said base part (A1), and each lateral edges of said base part (A2) being positioned between said base part (A1) and said lateral skirt (F); and said third belt ply (B3) formed by a base part (A3) provided on said lateral skirts (F) so as to form overlapped parts overlapped with said lateral skirt (F); wherein the ratio (BW/TW) of the belt width (BW) which is the axial length of the widest base part among said base parts (A1), (A2 and A3) along the base part to the tread width (TW) which is the axial length of said tread (T) along the tread surface is 0.75 to 0.85;

the ratio (FW/TW) of the skirt width (FW) which is the axial length of said lateral skirt (F) along the skirt (F) to said tread width (TW) is 0.1 to 0.35;

the ratio (OW/FW) of the overlapped width (OW) which is the axial length of said overlapped part along the overlapped part to said skirt width (FW) is 0.7 to 0.9;

each belt ply (B1), (B2), (B3) is composed of the belt cords whose initial modulus of elasticity is 200 to 400 $kgf/mm^2$; and said belt cords are laid at an angle of 25 degrees or less with respect to the equator of the tire and crossed with each other between adjacent belt plies.

* * * * *